(12) United States Patent
Kang et al.

(10) Patent No.: US 11,299,116 B2
(45) Date of Patent: Apr. 12, 2022

(54) VARIABLE BACK BEAM AND METHOD OF ALLOWING INFLATOR TO VARY VARIABLE BACK BEAM IN CASE OF COLLISION

(71) Applicants: HYUNDAI MOTOR COMPANY, Seoul (KR); KIA MOTORS CORPORATION, Seoul (KR)

(72) Inventors: Seung-Kyu Kang, Hwaseong-si (KR); Dae-Hyun Choi, Ansan-si (KR); Sung-Ung Ryu, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 86 days.

(21) Appl. No.: 16/842,345

(22) Filed: Apr. 7, 2020

(65) Prior Publication Data

US 2021/0070242 A1    Mar. 11, 2021

(30) Foreign Application Priority Data

Sep. 6, 2019 (KR) .......................... 10-2019-0110649

(51) Int. Cl.
*B60R 19/20* (2006.01)
*B62D 21/15* (2006.01)
*B62D 27/06* (2006.01)
*B60R 19/18* (2006.01)

(52) U.S. Cl.
CPC .......... *B60R 19/205* (2013.01); *B62D 21/152* (2013.01); *B62D 27/065* (2013.01); *B60R 2019/1806* (2013.01); *B60R 2019/186* (2013.01)

(58) Field of Classification Search
CPC ....... B60R 19/20; B60R 19/205; B62D 21/15; B62D 21/152
USPC .......................... 293/114; 296/187.06, 187.1
See application file for complete search history.

(56) References Cited

U.S. PATENT DOCUMENTS

| 3,447,826 | A  | * | 6/1969 | Gostomski | .............. | B60R 19/04 |
| | | | | | | 293/114 |
| 6,302,473 | B1 | | 10/2001 | Weber | | |
| 6,926,322 | B2 | * | 8/2005 | Browne | .................. | B60R 19/40 |
| | | | | | | 293/114 |

(Continued)

FOREIGN PATENT DOCUMENTS

| JP | 2017-119479 A | 7/2017 |
| JP | 2019-010977 A | 1/2019 |

(Continued)

*Primary Examiner* — Jason S Daniels
(74) *Attorney, Agent, or Firm* — Lempia Summerfield Katz LLC

(57) ABSTRACT

A variable back beam and a method of allowing an inflator to vary the variable back beam in case of collision. The variable back beam includes a main beam connected to a front end module carrier, an inner beam inserted into each of both sides of the main beam, and an operation member operable to move the inner beam in a vehicle-width direction at the time of left front or right front collision of the vehicle. Since the back beam is extended in length at the time of collision, the impact area or shock absorption area of the back beam can be increased, the impact on the back beam, a crush box, and a collision object can be reduced, and particularly, it is possible to reduce the crush length of the left or right end of the back beam.

17 Claims, 16 Drawing Sheets

(56) References Cited

U.S. PATENT DOCUMENTS

| | | | |
|---|---|---|---|
| 8,308,189 B2 * | 11/2012 | Matsushima | B62D 25/145 |
| | | | 280/732 |
| 8,827,356 B2 * | 9/2014 | Baccouche | B60R 21/013 |
| | | | 296/187.1 |
| 8,991,544 B1 * | 3/2015 | Stratten | B60R 19/16 |
| | | | 180/274 |
| 2014/0158449 A1 | 6/2014 | Chung et al. | |
| 2016/0280274 A1 | 9/2016 | Nusier et al. | |
| 2018/0208138 A1 * | 7/2018 | Wakabayashi | G01L 5/00 |

FOREIGN PATENT DOCUMENTS

| | | |
|---|---|---|
| KR | 10-2011-0051418 A | 5/2011 |
| KR | 10-1448745 B1 | 10/2014 |
| KR | 10-2016-0147473 A | 12/2016 |
| KR | 10-1826535 B1 | 2/2018 |

* cited by examiner

FIG.14A
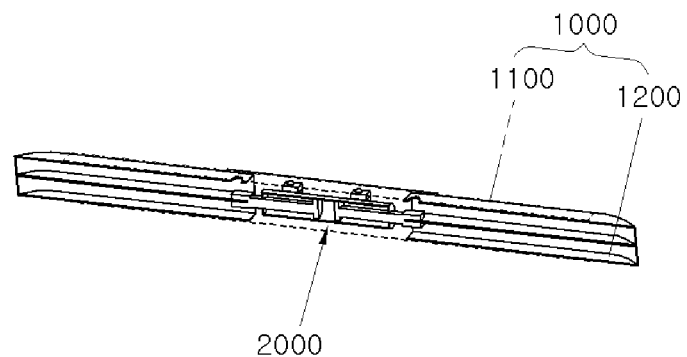
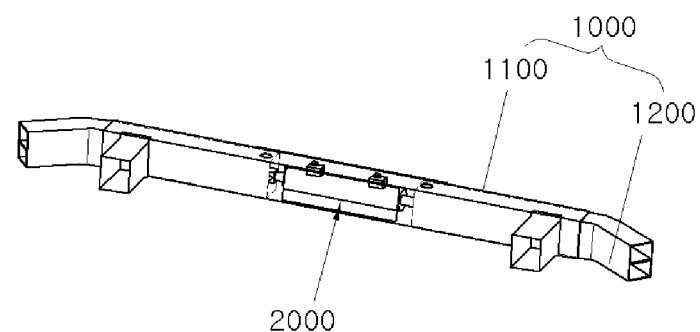

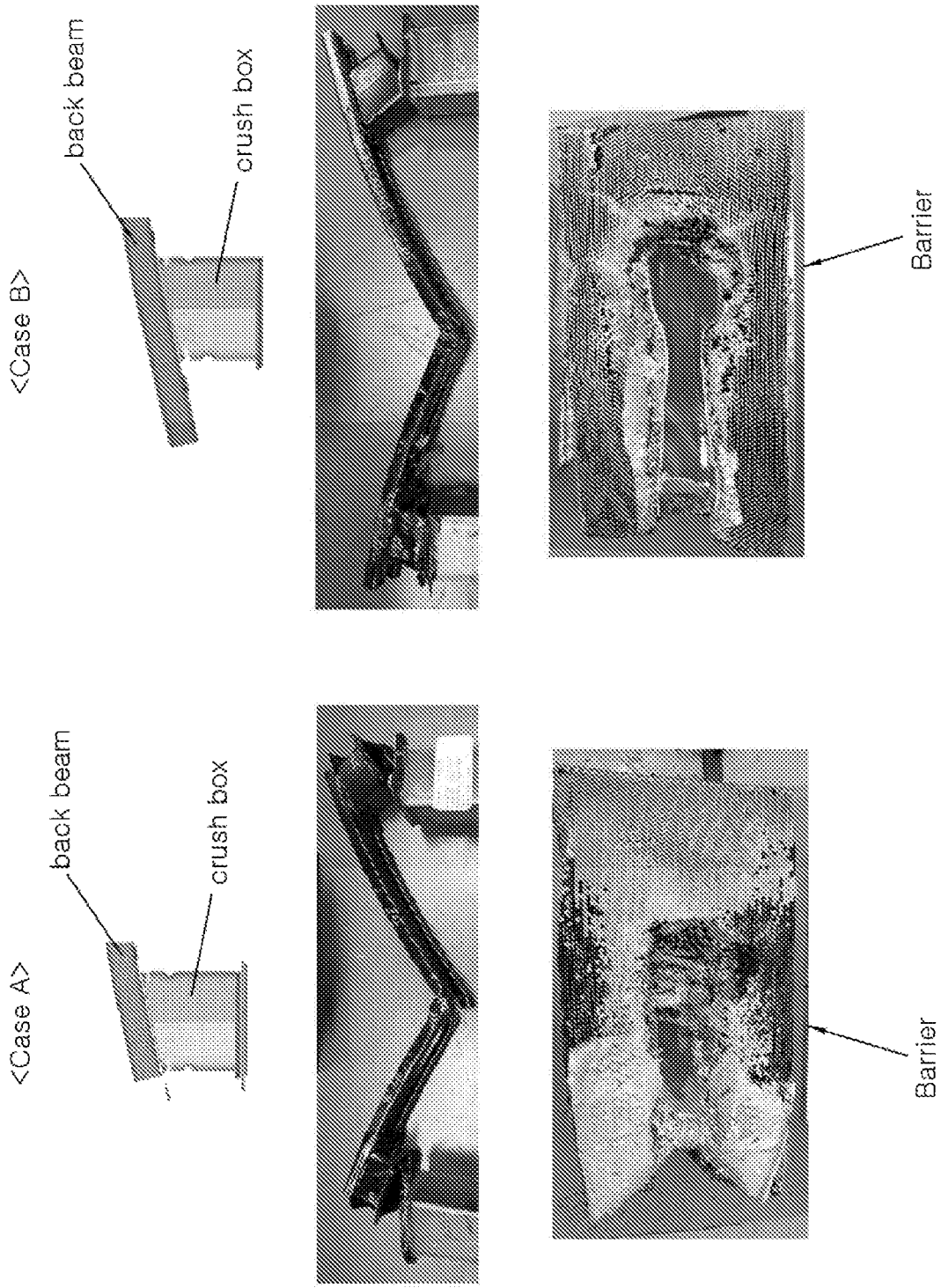

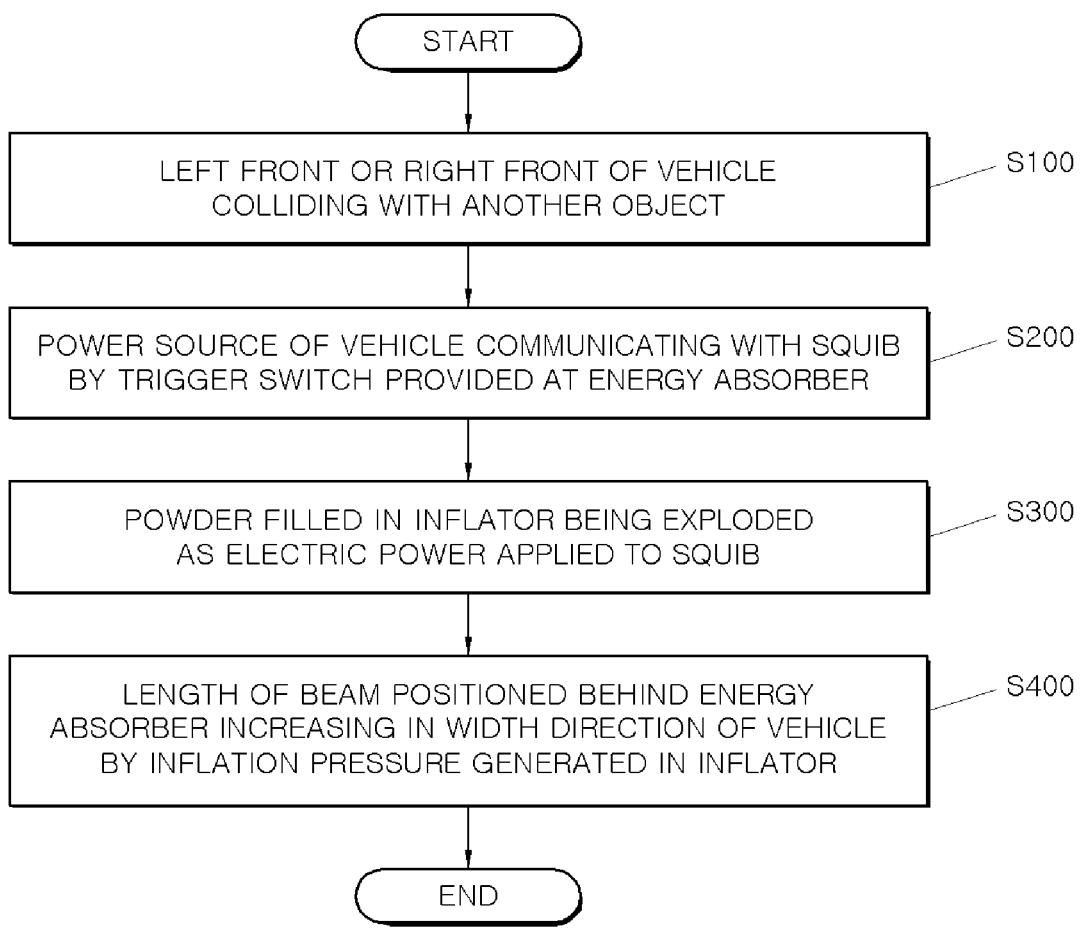

VARIABLE BACK BEAM AND METHOD OF ALLOWING INFLATOR TO VARY VARIABLE BACK BEAM IN CASE OF COLLISION

CROSS-REFERENCE TO RELATED APPLICATION

This application claims priority to and the benefit of Korean Patent Application No. 10-2019-0110649, filed on Sep. 6, 2019, which is incorporated herein by reference in its entirety.

FIELD

The present disclosure provides a variable back beam and a method of allowing an inflator to vary the variable back beam in case of collision.

BACKGROUND

The statements in this section merely provide background information related to the present disclosure and may not constitute prior art.

In general, the front end module of a passenger vehicle includes a front bumper cover defining the appearance of a bumper and a back beam positioned inside the front bumper cover. A foam for shock absorption is mounted between the front bumper cover and the back beam.

For an improvement in aerodynamics, the front bumper cover is made in a round shape and headlamps is mounted at both ends of the front bumper cover. Therefore, the length of the back beam is shorter than the length of the front bumper cover in a vehicle-width direction. Since the back beam is mounted close to the front bumper cover, the space for mounting the foam is also very limited. Thus, the length of the foam is also shorter than the length of the back beam in the vehicle-width direction.

Meanwhile, the European new car assessment program (EuroNCAP) will include a mobile progressive deformable barrier (MPDB) mutual safety assessment.

In the MPDB mutual safety assessment, the front of the vehicle is divided by 50 to 50 and a barrier of 1388 kilogram (kg) collides with the divided left front or right front. In this case, each of the vehicle and the barrier moves at a speed of 50 kilometer per hour (kph). After the collision, the evaluation is performed according to the deformed shape of the barrier.

As described above, in general, the length of the back beam is shorter than the length of the front bumper cover in the vehicle-width direction, and the length of the foam is also shorter than the length of the back beam.

Accordingly, in the passenger vehicle equipped with the front end module, when the left front or right front thereof collides with the barrier as in the MPDB mutual safety assessment, we have discovered that the shock absorption areas of the foam and back beam are limited. Hence, an impact will be concentrated on a crush box attached to the beam.

The above information disclosed in this Background section is only for enhancement of understanding of the background of the present disclosure, and therefore it may contain information that does not form the prior art that is already known to a person of ordinary skill in the art.

SUMMARY

The present disclosure provides a variable back beam of which the shape can be deformed at the time of left front or right front collision of a vehicle, to increase its shock absorption area and reduce an impact concentrated on a crush box, and a method of allowing an inflator to vary the variable back beam in case of collision.

In accordance with a form of the present disclosure, a variable back beam includes a beam of which a length increases in a width direction of a vehicle at the time of left front or right front collision of the vehicle.

The beam may include a main beam connected to a front end module carrier of the vehicle, and an inner beam inserted into each of both sides of the main beam.

The variable back beam may further include an operation member configured to generate an external force to increase the length of the beam, and the operation member may be operable to move the inner beam to increase a protruding length of the inner beam from the main beam.

The main beam may include an insertion opening formed on each of two surfaces thereof perpendicular to the ground so that the inside of the main beam is open through the insertion opening to the outside, and the operation member may be mounted inside the main beam through the insertion opening.

The main beam may include a fixing hole formed on one surface thereof parallel to the ground so that a bolt fastened to the operation member passes through the fixing hole, and the main beam may include a reinforcement panel formed on a front surface of the main beam to cover the insertion opening.

A crush box may be attached perpendicularly to the main beam on each of both sides of the main beam.

The inner beam may include a non-exposed part inserted into the main beam and an exposed part exposed out of the main beam, and the inner beam may be bent at the boundary between the non-exposed part and the exposed part.

A lubricant may be applied on the surfaces of the non-exposed part, and the non-exposed part may be formed with a connector connected to the operation member at an end of the non-exposed part.

The non-exposed part may include at least one groove formed on the surface of the non-exposed part for collection of the lubricant.

The connector may include a mounting plate formed parallel to the ground inside the end of the non-exposed part, and an assembly hole formed on the side of the non-exposed part so as to be parallel to the mounting plate.

The operation member may include a push bracket fastened to the inner beam, an inflator configured to move the push bracket at the time of collision, and a trigger switch for operating the inflator at the time of collision.

The push bracket may include a rod protruding from the inflator and having a fastening port fastened to a connector provided in the inner beam, and a push bracket head connected to the end of the rod and moving inside the inflator.

The push bracket may be inserted into each of both longitudinal sides of the inflator, the inflator may be provided, at the center thereof, with powder to move the push bracket by explosion at the time of collision, and the inflator may be provided with a squib for exploding the powder in response to an external signal.

The inflator may include a cylinder body into which the end of the push bracket is inserted, and the cylinder body may have a vent hole for discharge of the gas generated during explosion of the powder.

An energy absorber may be mounted in front of the main beam, the trigger switch may include a cable extending from the squib to the energy absorber and a switch part connected to the cable while having one or more piezoelectric elements, and the cable may be connected to a power source of the vehicle.

The switch part may be in the form of a bar having a predetermined length, the one or more piezoelectric elements may be mounted to the switch part while being spaced at a distance, and the switch part may be mounted to a slit formed on the upper surface of the energy absorber.

In accordance with another form of the present disclosure, a method of allowing an inflator to vary a variable back beam in case of collision with an object includes the steps of sensing a collision of a left front or right front of a vehicle with the object, communicating between a power source of the vehicle and a squib by a trigger switch provided in an energy absorber, exploding powder filled in an inflator by electric power applied to the squib, and increasing a length of a beam positioned behind the energy absorber in a width direction of the vehicle by inflation pressure generated in the inflator.

The beam may include a main beam connected to a crush box and an inner beam inserted into each of both sides of the main beam, and in the step of increasing a length of a beam positioned behind the energy absorber in a width direction of the vehicle by inflation pressure generated in the inflator, the inner beam may be moved by the inflation pressure such that a protruding length of the inner beam from the main beam increases.

In the step of increasing a length of a beam positioned behind the energy absorber in a width direction of the vehicle by inflation pressure generated in the inflator, the gas generated in the inflator may be discharged through a vent hole to the outside.

The trigger switch may include two piezoelectric elements, and in the step of communicating between a power source of the vehicle and a squib by a trigger switch, the electric power of the vehicle may be applied to the squib when a load is applied to the two piezoelectric elements.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIGS. 14A and 14B are views for comparing the variable back beams before (a) and after (b) collision;

FIG. 15 is a view illustrating states of the back beam and barrier on which the MPDB mutual safety assessment is performed; and FIG. 16 is a flowchart illustrating a method of allowing an inflator to vary a variable back beam in case of collision according to a form of the present disclosure.

Figure 1:
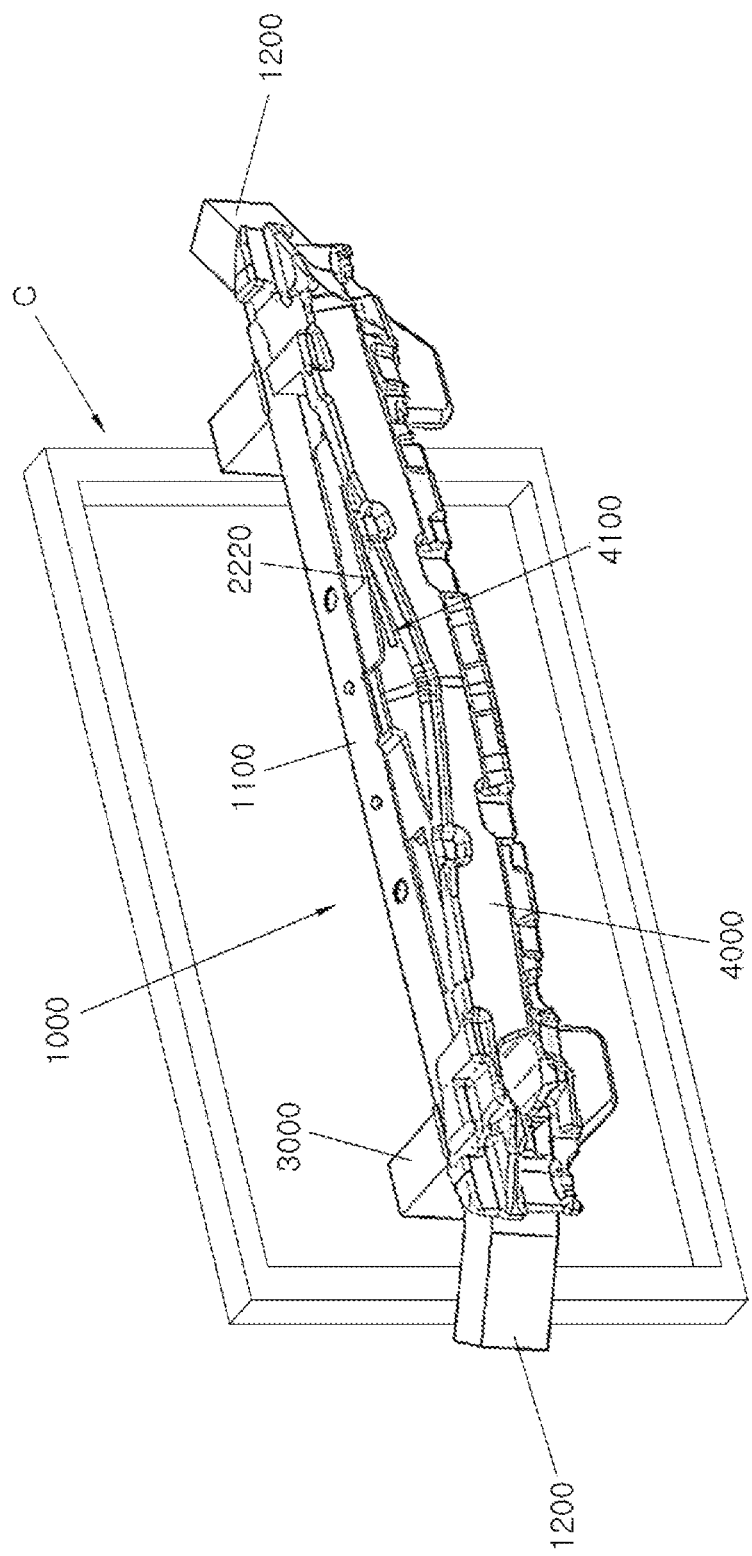
FIG. 1 is a perspective view illustrating a variable back beam according to a form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, a variable back beam and a method of allowing an inflator to vary a variable back beam in case of collision according to exemplary forms of the present disclosure will be described with reference to the accompanying drawings.

As illustrated in FIGS. 1 to 14, a variable back beam according to a form of the present disclosure includes a beam 1000 of which the length increases in the width direction of a vehicle at the time of the left front or right front collision of the vehicle, and an operation member 2000 that generates an external force to increase the length of the beam 1000.

The beam 1000 includes a main beam 1100 connected to a front end module carrier C, and an inner beam 1200 inserted into each of both sides of the main beam 1100. The operation member 2000 is operable to move the inner beam 1200 to increase the protruding length of the inner beam 1200 from the main beam 1100.

Figure 4:
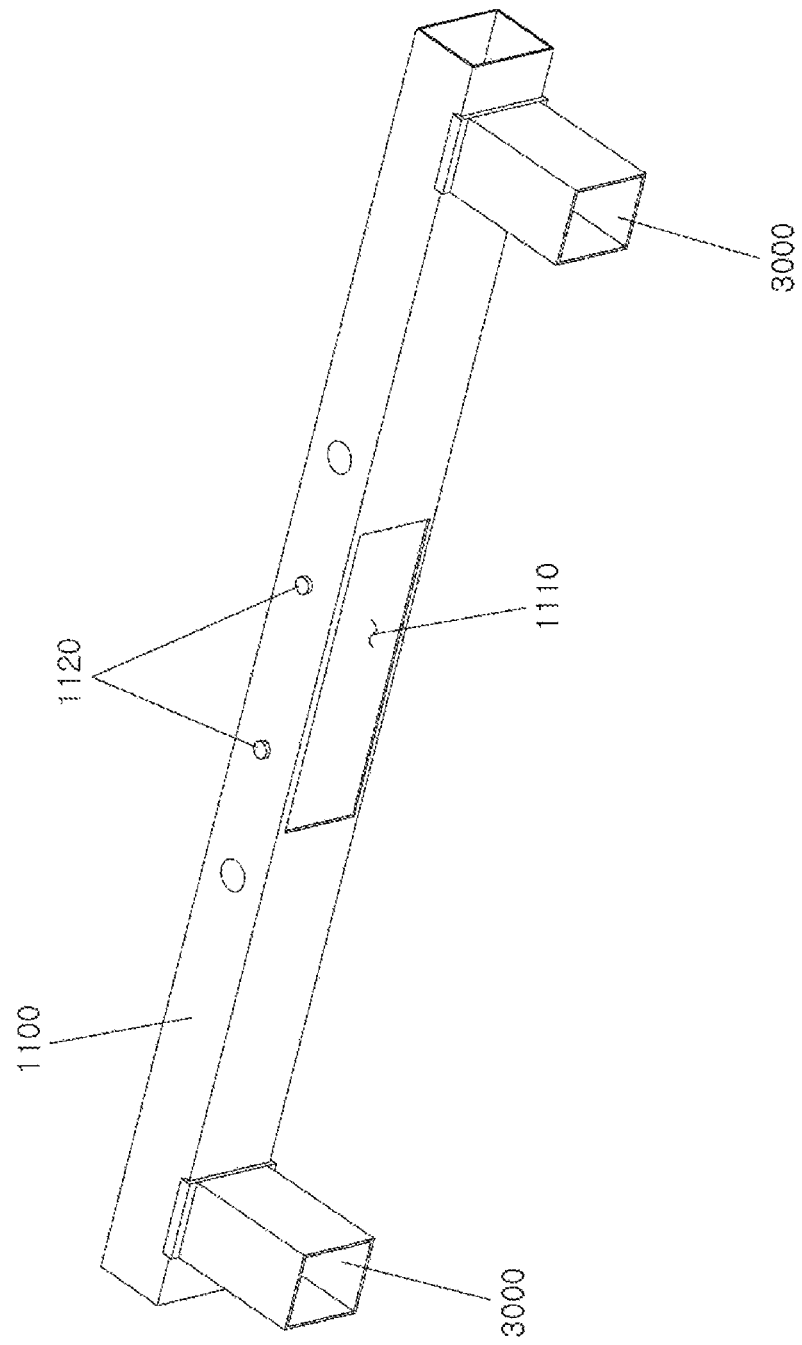
FIGS. 4 and 5 are perspective views illustrating the main beam of FIG. 1.
Figure 5:
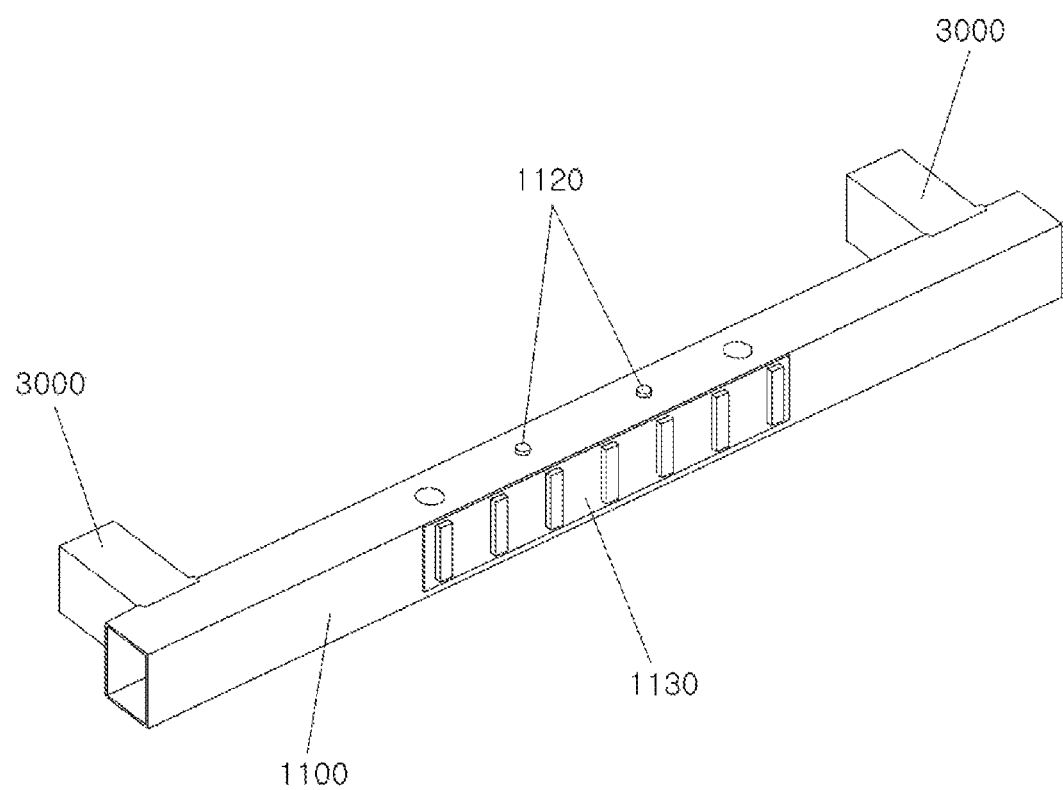

As illustrated in FIG. 4, the main beam 1100 is made in the form of a square beam. The main beam 1100 has an insertion opening 1110 formed on each of two surfaces thereof perpendicular to the ground so that the inside of the main beam 110 is open through the insertion opening 1110 to the outside. The operation member 2000 is mounted inside the main beam 1100 through the insertion opening 1110.

The main beam 1100 has a fixing hole 1120 formed on one surface thereof parallel to the ground so that the bolt fastened to the operation member 2000 passes through the fixing hole 1120. As the bolt is fastened through the fixing hole 1120 to the operation member 2000, the position of the operation member 2000 is fixed.

The main beam 1100 has a reinforcement panel 1130 formed on the front surface thereof to cover the insertion opening 1110. The reinforcement panel 1130 inhibits the concentration of stress on the insertion opening 1110. The stress is not concentrated on the reinforcement panel 1130 and is distributed to the left and right portions of the main beam 1100.

Figure 2:
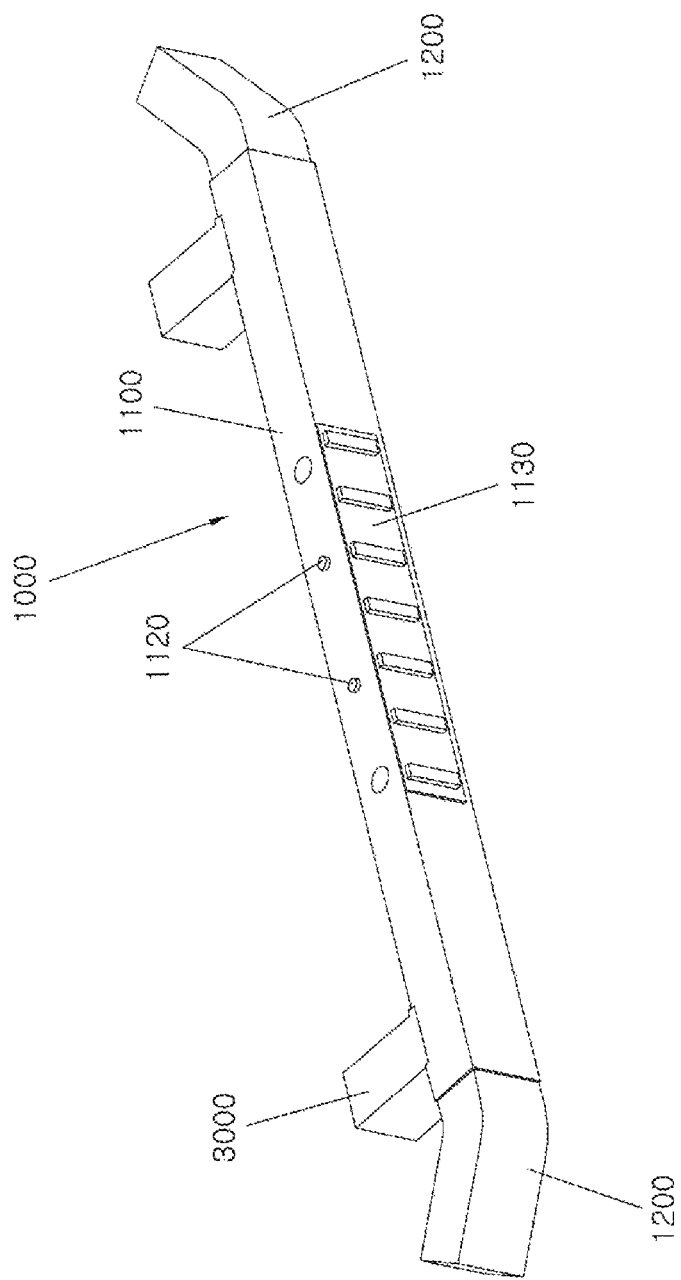
FIGS. 2 and 3 are perspective views illustrating a main part of the variable back beam of FIG. 1.
Figure 3:
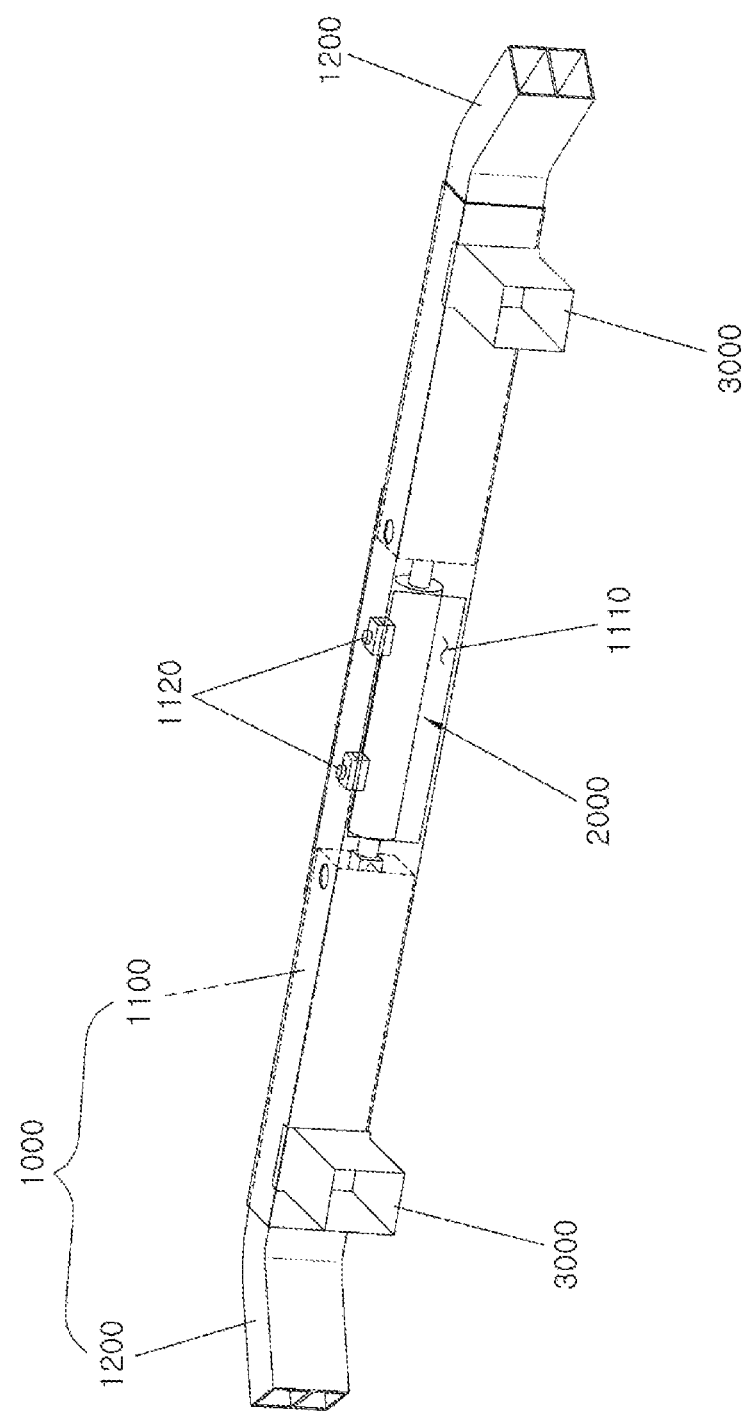

As shown in FIGS. 1 and 2, a crush box 3000 is attached perpendicularly to the main beam 1100 on each of both sides of the main beam 1100. The crush box 3000 is connected to the front end module carrier C.

Figure 6:
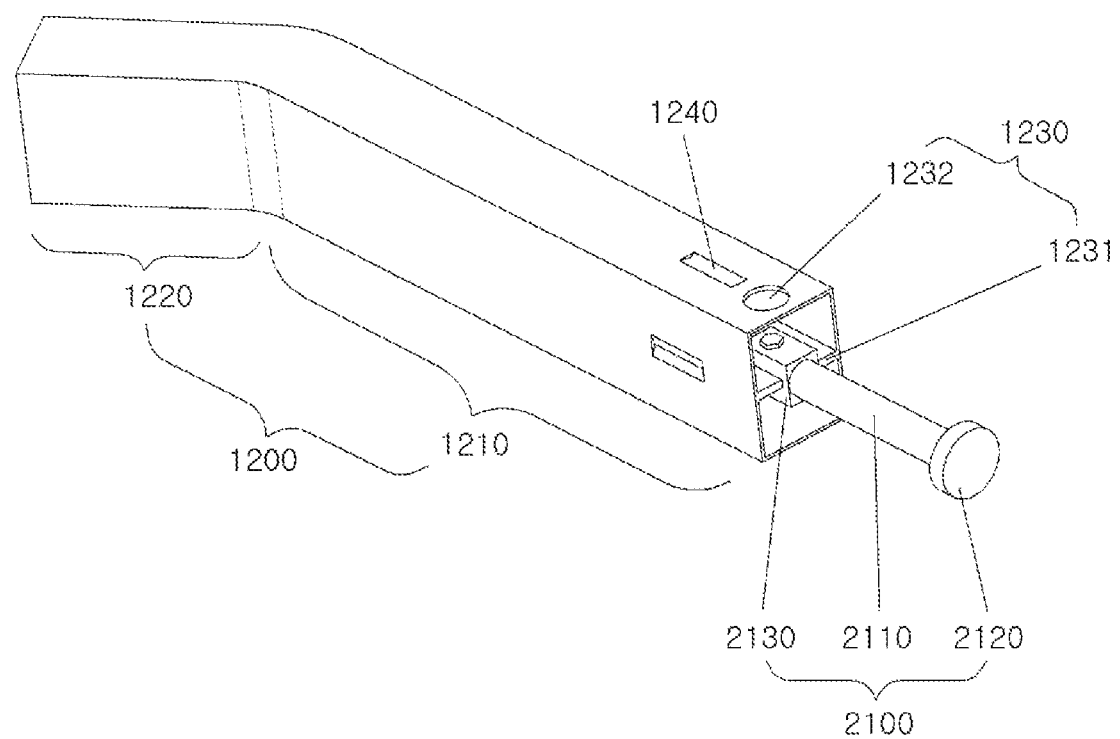
FIG. 6 is a perspective view illustrating the inner beam of FIG. 1.

As illustrated in FIG. 6, the inner beam 1200 is made in the form of a square beam. The inner beam 1200 includes a non-exposed part 1210 inserted into the main beam 1100 and an exposed part 1220 exposed out of the main beam 1100. The inner beam 1200 is bent at the boundary between the non-exposed part 1210 and the exposed part 1220. As the inner beam 1200 is made in a bent form, the insertion of the exposed part 1220 into the main beam 1100 is inhibited.

A lubricant is applied on the surface of the non-exposed part 1210. The non-exposed part 1210 has at least one groove 1240 formed on the surface thereof for collection of the lubricant. Since the lubricant is collected in the groove 1240, the lubricant may be inhibited from leaking between the main beam 1100 and the inner beam 1200 and an appropriate amount of lubricant may be present between the main beam 1100 and the inner beam 1200.

The non-exposed part 1210 is formed, at the end thereof, with a connector 1230 connected to the operation member 2000. The connector 1230 includes a mounting plate 1231 formed parallel to the ground inside the end of the non-exposed part 1210 and an assembly hole 1232 formed on the side of the non-exposed part 1210 so as to be parallel to the mounting plate 1231.

The inner beam 1200 is connected to the operation member 2000 in such a manner that the bolt inserted into the inner beam 1200 through the assembly hole 1232 is fastened to the fastening holes formed on the mounting plate 1231 and the end of the following push bracket 2100 in the state in which the end of the push bracket 2100 overlaps with the mounting plate 1231.

Figure 7:
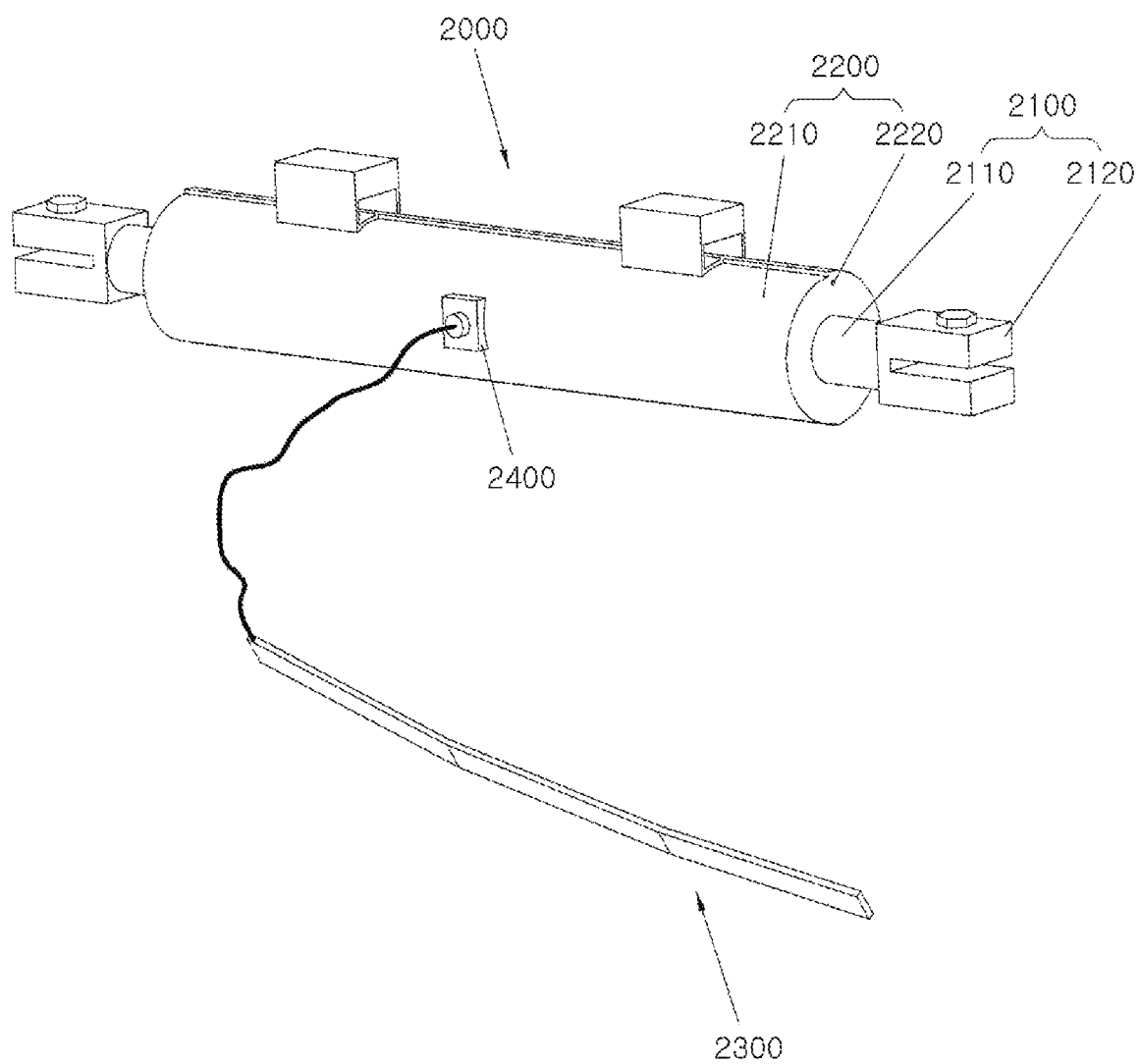
FIG. 7 is a perspective view illustrating the operation member of FIG. 1.

In an example, the end of the push bracket 2100 is formed as a "U" shape (see FIG. 7). One surface of the mounting plate of the inner beam 1200 is connected to two surfaces of the push bracket 2100 through the bolt. Due to the U-shaped end of the push bracket 2100, the dislocation of the push bracket 2100 from the mounting plate 1231 is inhibited even though the bolt is broken when the push bracket 2100 pushes the inner beam 1200.

Figure 8:
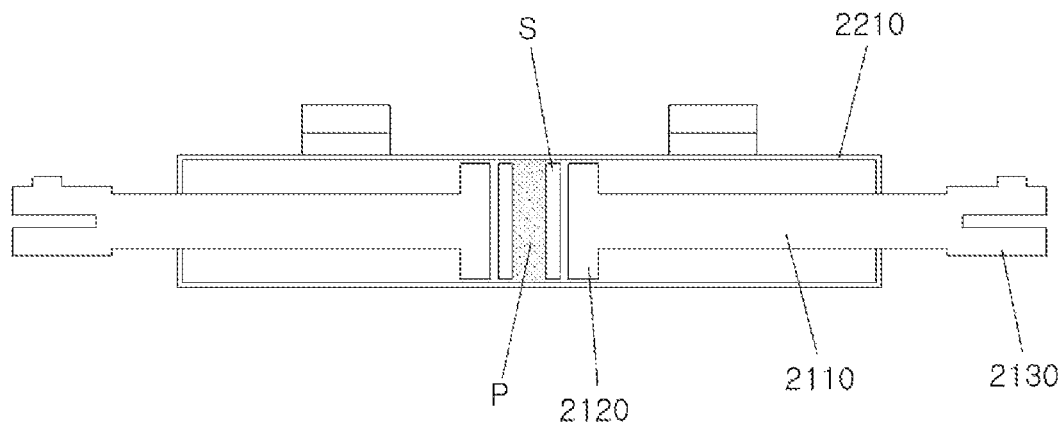
FIG. 8 is a cross-sectional view illustrating the operation member of FIG. 7.

As illustrated in FIGS. 7 and 8, the operation member 2000 includes a push bracket 2100 fastened to the inner beam 1200, an inflator 2200 for moving the push bracket 2100 at the time of collision, and a trigger switch 2300 for operating the inflator 2200 at the time of collision.

The push bracket 2100 is inserted into each of both longitudinal sides of the inflator 2200. The inflator 2200 is provided, at the center thereof, with powder P to move the push bracket 2100 by explosion at the time of collision. The inflator 2200 is provided with a squib 2400 for exploding the powder P in response to an external signal.

Figure 9:
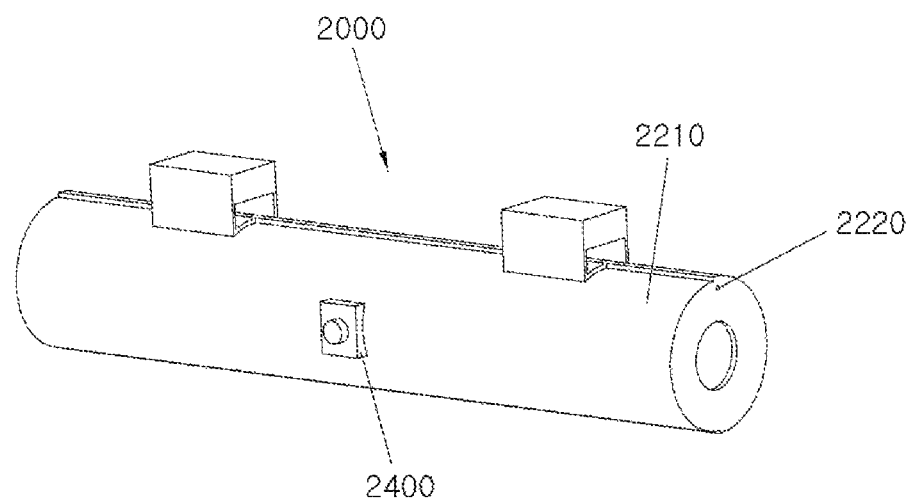
FIG. 9 is a perspective view illustrating an inflator in the operation member of FIG. 7.
Figure 10:
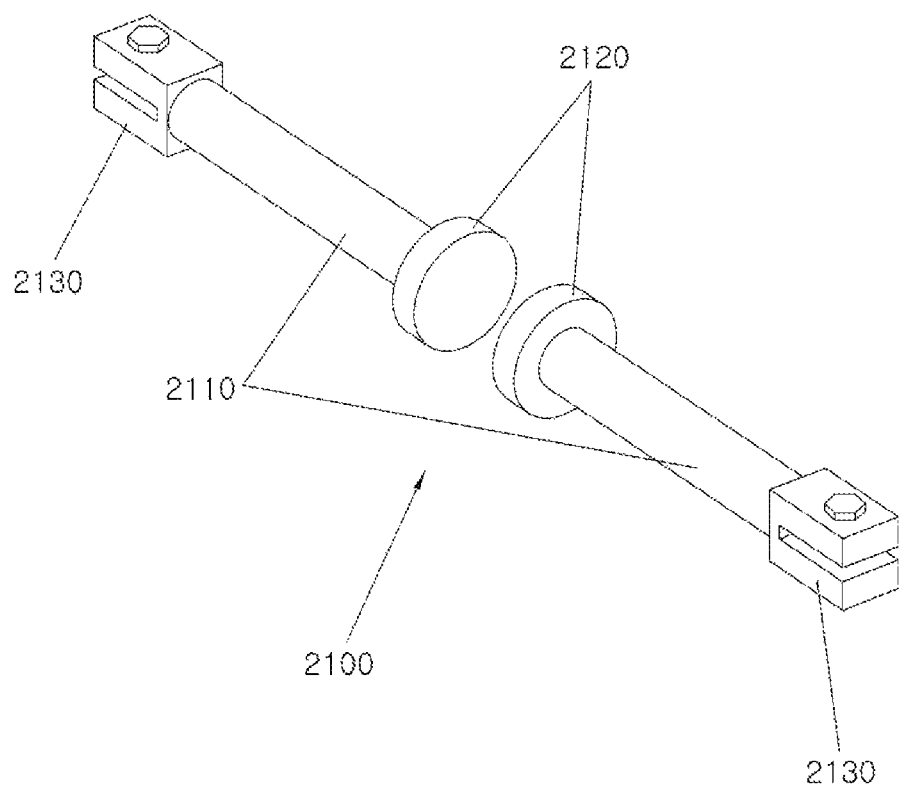
FIG. 10 is a perspective view illustrating a push bracket in the operation member of FIG. 7.

As illustrated in FIGS. 9 and 10, the push bracket 2100 includes a rod 2110, which protrudes from the inflator 2200 and has a fastening port 2130 fastened to the connector 1230 provided in the inner beam 1200, and a push bracket head 2120 which is connected to the end of the rod 2110 and moves inside the inflator 2200. The fastening port 2130 has a "U" shape as described above. The fastening port 2130 overlaps with the mounting plate 1231 and is connected to the mounting plate 1231 by the bolt.

The push bracket head 2120 includes a sponge diaphragm S mounted thereto (see FIG. 8). As the sponge diaphragm S is positioned between the powder P and the push bracket head 2120, the powder P may be positioned at the center of the inflator 2200 even if a small amount of the powder P is present therein.

By adjusting the length of the inflator 2200 and the thickness of the push bracket head 2120, the stroke, which is a moving distance of the rod 2110 is controlled.

As illustrated in FIGS. 8 and 9, the inflator 2200 includes a cylinder body 2210 into which the end of the push bracket 2100 is inserted. The cylinder body 2210 has a vent hole 2220 for discharge of the gas generated during explosion of the powder P. The smoke and gas generated during explosion of the powder P are discharged through the vent hole 2220 to the outside.

Meanwhile, referring back to FIG. 1, an energy absorber 4000 is mounted in front of the main beam 1100. In a form of the present disclosure, referring to FIG. 11, a switch part 2320 as the sensing device for detection of collision is mounted to the energy absorber 4000.

Figure 11:
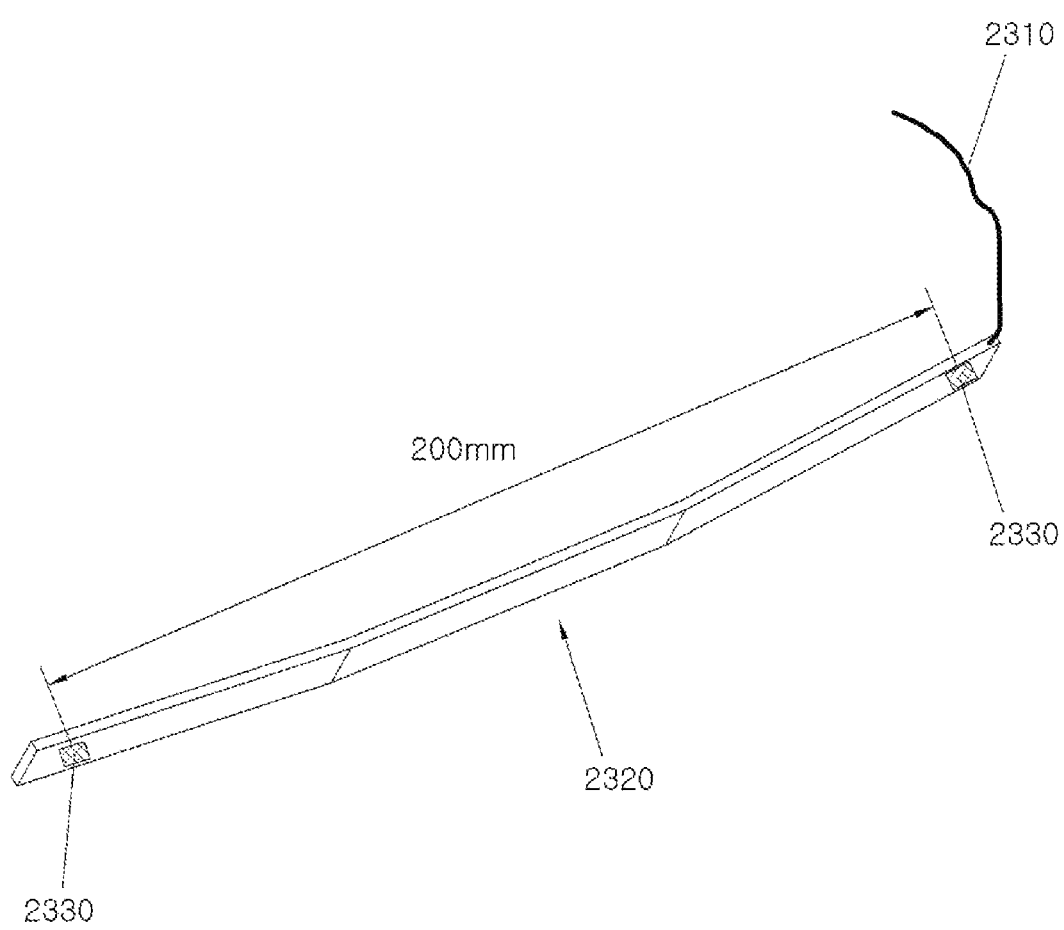
FIG. 11 is a perspective view illustrating a trigger switch of FIG. 1.

As illustrated in FIG. 11, the trigger switch 2300 includes a cable 2310 extending from the squib 2400 to the energy absorber 4000, and the switch part 2320 connected to the cable 2310 and having one or more piezoelectric elements 2330. The cable 2310 is connected to the power source of the vehicle.

Figure 12:
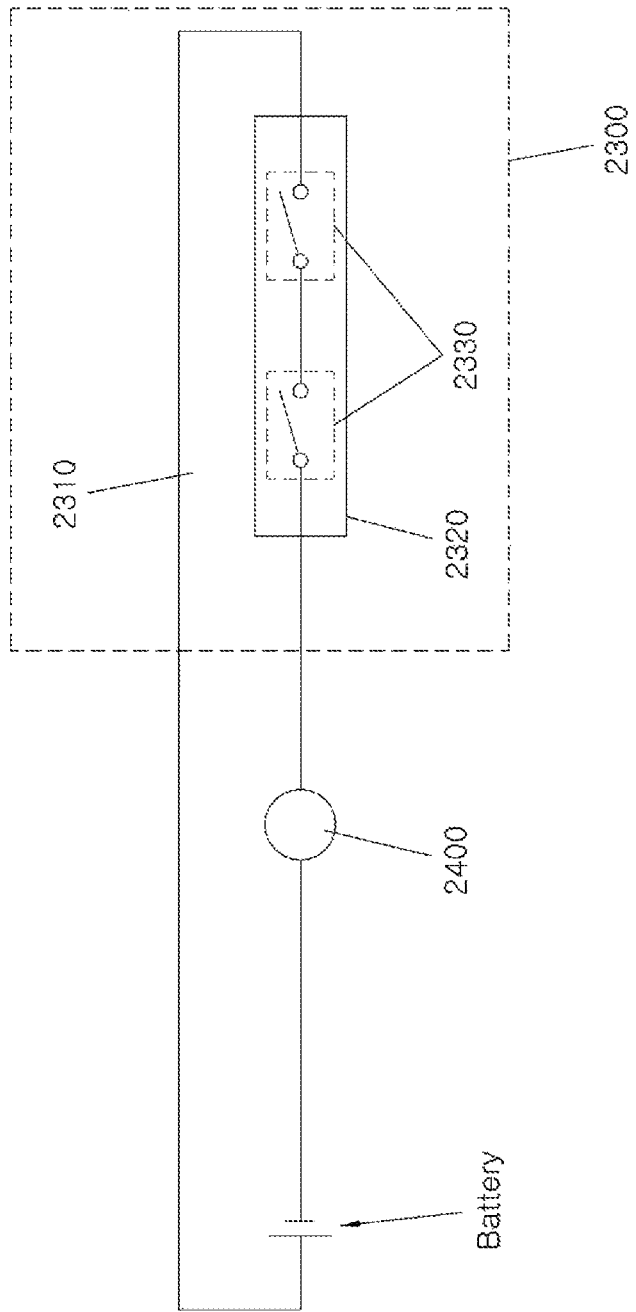
FIG. 12 is a circuit diagram illustrating electrical connection between the trigger switch and a squib.

The switch part 2320 is made in the form of a bar having a predetermined length. The one or more piezoelectric elements 2330 are mounted to the switch part 2320 while being spaced at a distance (for example, 200 mm or more). The resistance of each piezoelectric element 2330 is infinite when the piezoelectric element 2330 is not pressurized, and is "0" when it is pressurized. Accordingly, as illustrated in FIG. 12, the piezoelectric element 2330 of the switch part 2320 may be operated as a switch. Since the resistance of the switch part 2320 is infinite when no pressure is applied to the energy absorber 4000, the application of the electric power of the vehicle to the squib 2400 is blocked. Since the resistance of the switch part 2320 is "0" when a pressure is applied to the energy absorber 4000, the electric power of the vehicle is applied to the squib 2400. Therefore, the powder P filled in the inflator 2200 will be exploded only at the time of the head-on collision of the vehicle.

Figure 13:
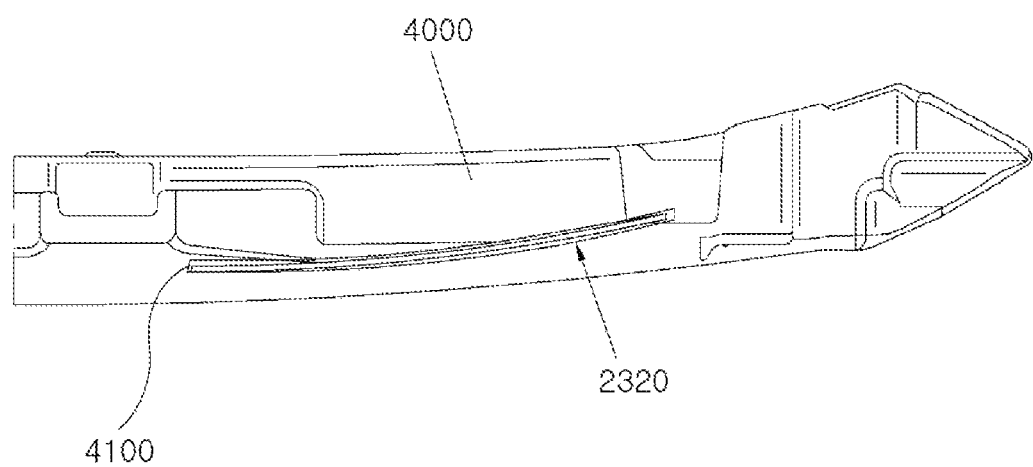
FIG. 13 is a view illustrating an example in which the switch part of FIG. 11 is mounted to an energy absorber.

Meanwhile, as illustrated in FIG. 13, the switch part 2320 is mounted to a slit 4100 formed on the upper surface of the energy absorber 4000. At the time of forward collision, an external object or an in-vehicle object of which the shape is changed may reach the energy absorber 4000. Since the switch part 2320 may be broken by the object that reaches the energy absorber 4000 at the time of forward collision, it is not preferable that the switch part 2320 is exposed to the front of the energy absorber 4000.

Figure 14B:
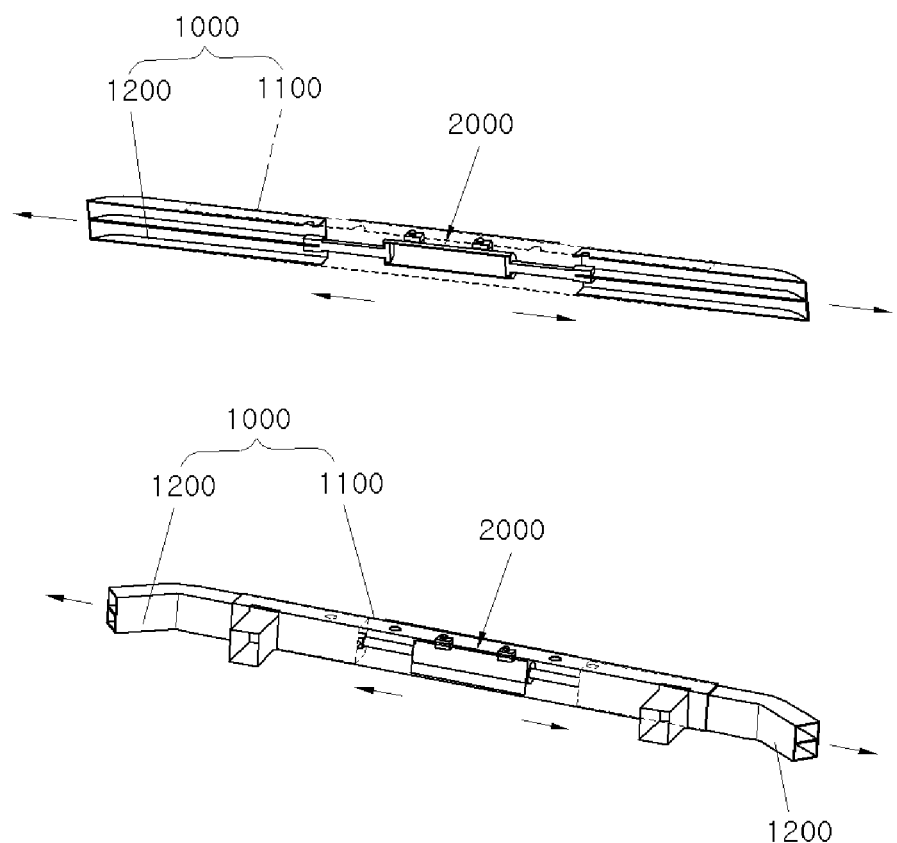

As illustrated in FIGS. 14A and 14B, the vehicle travels with the powder P filled at the center of the inflator 2200. When the vehicle collides while traveling, the resistance of the piezoelectric element 2330 mounted to the switch part 2320 is "0" and the electric power of the vehicle is applied to the squib 2400. The squib 2400 generates light and high heat instantaneously by the electric power of vehicle and ignites the powder P filled in the inflator 2200.

When the powder P is ignited, the sponge diaphragm S mounted to the push bracket head 2120 is burned. The push bracket head 2120 is pressurized due to the smoke and gas generated by the ignition of the powder P. As the push bracket head 2120 is pressurized, the rod 2110 moved outwards from the inflator 2200. The inner beam 1200 connected to the rod 2110 moves outwards from the main beam 1100 by the protruding length of the rod 2110.

As the protruding length of the inner beam 1200 from the main beam 1100 is increased, the total length of the back beam is instantaneously increased. Since the length of the back beam is increased, it is possible to increase the impact area or shock absorption area of the back beam to further reduce collision energy. Thus, it is possible to reduce the impact on the back beam, the crush box 3000, and the collision object.

FIG. 15 illustrates the back beam and the barrier on which the MPDB mutual safety assessment is performed. As illustrated in FIG. 15, it can be seen that, compared to the case where the crush box 3000 overlaps with the back beam end (Case A), in the case where the area of the back beam end corresponding to a load path for transfer of energy to the crush box 3000 is large (Case B), the amount of deformation of the back beam is reduced and the degree of infiltration of the barrier is small (Case A: 700 mm; Case B: 500 mm).

That is, it may be inferred that when the portion of the back beam, corresponding to the load path, is larger in area, the amount of reduction of energy is larger at the time of left front collision. In addition, it may be inferred that when the portion of the back beam, corresponding to the load path, is larger in area, the protruding length of the left or right end of the back beam in front of the vehicle is reduced.

Therefore, as in the above-mentioned form of the present disclosure, as the inner beam 1200 protrudes from the main beam 1100 at the time of the left front or right front collision of the vehicle, it is possible to further increase the shock absorption area of the portion corresponding to the load path during collision and to further reduce the impact on the crush box 3000, the back beam including the main beam 1100 and the inner beam 1200, and the collision object. Particularly, it is possible to reduce the protruding length of the left or right end of the back beam in front of the vehicle at the time of collision.

Meanwhile, the variable back beam having the above-mentioned configuration according to the form of the present disclosure is varied at the time of collision as illustrated in the flowchart of FIG. 16.

As illustrated in FIG. 16, a method of allowing an inflator to vary a variable back beam in case of collision according to a form of the present disclosure includes a step in which the left front or right front of a vehicle collides with another object (S100), a step of communicating between the power source of the vehicle and a squib 2400 by a trigger switch 2300 provided at an energy absorber 4000 (S200), a step of exploding powder filled in an inflator 2200 as electric power is applied to the squib 2400 (S300), and a step of increasing the length of a beam 1000 positioned behind the energy absorber 4000 in the width direction of the vehicle by the inflation pressure generated in the inflator 2200 (S400).

As described above, the beam 1000 includes a main beam 1100 connected to a crush box 3000, and an inner beam 1200 inserted into each of both sides of the main beam 1100. In the step of increasing the length of a beam 1000 positioned behind the energy absorber 4000 in the width direction of the vehicle by the inflation pressure generated in the inflator 2200 (S400), the inner beam 1200 is moved by the inflation pressure such that the protruding length of the inner beam 1200 from the main beam 1100 increases.

In step of increasing the length of a beam 1000 positioned behind the energy absorber 4000 in the width direction of the vehicle by the inflation pressure generated in the inflator 2200 (S400), the gas generated in the inflator 2200 is discharged through a vent hole 2220 to the outside. Since the gas is discharged through the vent hole 2220, the breakage of the inflator 2200 is inhibited.

The trigger switch 2300 includes two piezoelectric elements 2330. In the step of communicating between the power source of the vehicle and a squib 2400 by a trigger switch 2300 provided at an energy absorber 4000 (S200), the electric power of the vehicle is applied to the squib 2400 when a load is applied to the two piezoelectric elements 2330.

In accordance with the variable back beam and the method of allowing an inflator to vary a variable back beam in case of collision according to exemplary forms of the present disclosure, since the back beam is extended in length at the time of the left front or right front collision of the vehicle, the impact area or shock absorption area of the back beam can be increased.

Thus, the impact on the back beam, the crush box, and the collision object is reduced. In particular, it is possible to reduce the length of the left or right end of the back beam, which protrudes in front of the vehicle, at the time of collision.

While the present disclosure has been described in connection with what is presently considered to be practical exemplary forms, it is to be understood that the present disclosure is not limited to the disclosed forms, but, on the contrary, it is intended to cover various modifications and equivalent arrangements included within the spirit and scope of the present disclosure.

What is claimed is:

1. A variable back beam for a vehicle, the variable back beam comprising:
    a beam of which a length increases in a width direction of the vehicle at a time of left front or right front collision of the vehicle; and
    an operation member configured to generate an external force to increase the length of the beam,
    wherein the beam comprises:
        a main beam connected to a front end module carrier of the vehicle; and
        an inner beam inserted into each of both sides of the main beam, and
    wherein the operation member is operable to move the inner beam to increase a protruding length of the inner beam from the main beam, and
    wherein:
        the inner beam comprises a non-exposed part inserted into the main beam and an exposed part exposed out of the main beam, and
        the inner beam is bent at a boundary between the non-exposed part and the exposed part.

2. The variable back beam of claim 1, wherein:
    the main beam includes an insertion opening formed on each of two surfaces thereof perpendicular to a ground so that the inside of the main beam is open through the insertion opening to the outside; and
    the operation member is mounted inside the main beam through the insertion opening.

3. The variable back beam of claim 2, wherein:
    the main beam includes a fixing hole formed on one surface thereof parallel to the ground so that a bolt fastened to the operation member passes through the fixing hole; and
    the main beam includes a reinforcement panel formed on a front surface of the main beam to cover the insertion opening.

4. The variable back beam of claim 1, wherein a crush box is attached perpendicularly to the main beam on each of both sides of the main beam.

5. The variable back beam of claim 1, wherein:
a lubricant is applied on surfaces of the non-exposed part; and
the non-exposed part is formed with a connector connected to the operation member at an end of the non-exposed part.

6. The variable back beam of claim 5, wherein the non-exposed part includes at least one groove formed on the surface of the non-exposed part for collection of the lubricant.

7. The variable back beam of claim 5, wherein the connector comprises:
a mounting plate formed parallel to a ground inside the end of the non-exposed part; and
an assembly hole formed on a side of the non-exposed part so as to be parallel to the mounting plate.

8. The variable back beam of claim 1, wherein the operation member comprises:
a push bracket fastened to the inner beam;
an inflator configured to move the push bracket at a time of collision; and
a trigger switch for operating the inflator at the time of collision.

9. The variable back beam of claim 8, wherein the push bracket comprises:
a rod protruding from the inflator and having a fastening port fastened to a connector provided in the inner beam; and
a push bracket head connected to an end of the rod and moving inside the inflator.

10. The variable back beam of claim 8, wherein:
the push bracket is inserted into each of both longitudinal sides of the inflator;
the inflator is provided, at the center thereof, with powder to move the push bracket by explosion at the time of collision; and
the inflator is provided with a squib for exploding the powder in response to an external signal.

11. The variable back beam of claim 10, wherein:
the inflator comprises a cylinder body into which the end of the push bracket is inserted; and
the cylinder body has a vent hole for discharge of gas generated during explosion of the powder.

12. The variable back beam of claim 10, wherein:
an energy absorber is mounted in front of the main beam;
the trigger switch comprises a cable extending from the squib to the energy absorber and a switch part connected to the cable while having one or more piezoelectric elements; and
the cable is connected to a power source of the vehicle.

13. The variable back beam of claim 12, wherein:
the switch part is in the form of a bar having a predetermined length;
the one or more piezoelectric elements are mounted to the switch part while being spaced at a distance; and
the switch part is mounted to a slit formed on an upper surface of the energy absorber.

14. A method of allowing an inflator to vary a variable back beam for a vehicle in case of collision with an object, the method comprising the steps of:
sensing a collision of a left front or right front of the vehicle with the object;
communicating between a power source of the vehicle and a squib by a trigger switch provided in an energy absorber;
exploding powder filled in an inflator by electric power applied to the squib; and
increasing a length of a beam positioned behind the energy absorber in a width direction of the vehicle by inflation pressure generated in the inflator;
wherein the beam comprises a main beam connected to a crush box and an inner beam inserted into each of both sides of the main beam, and
wherein:
the inner beam comprises a non-exposed part inserted into the main beam and an exposed part exposed out of the main beam, and
the inner beam is bent at a boundary between the non-exposed part and the exposed part.

15. The method of claim 14, wherein:
in the step of increasing a length of a beam positioned behind the energy absorber in a width direction of the vehicle by inflation pressure generated in the inflator, the inner beam is moved by the inflation pressure such that a protruding length of the inner beam from the main beam increases.

16. The method of claim 14, wherein in the step of increasing a length of a beam positioned behind the energy absorber in a width direction of the vehicle by inflation pressure generated in the inflator, gas generated in the inflator is discharged through a vent hole to an outside.

17. The method of claim 14, wherein:
the trigger switch comprises two piezoelectric elements; and
in the step of communicating between a power source of the vehicle and a squib by a trigger switch, the electric power of the vehicle is applied to the squib when a load is applied to the two piezoelectric elements.

* * * * *